United States Patent Office.

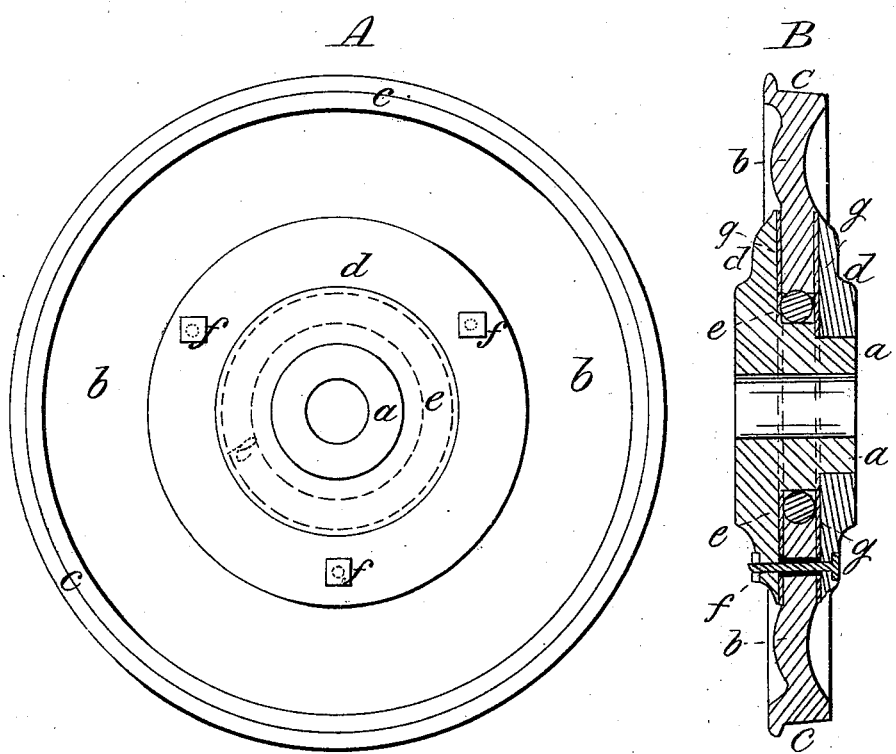

JOHN RADDIN, OF LYNN, MASSACHUSETTS.

Letters Patent No. 64,796, dated May 14, 1867.

IMPROVEMENT IN CAR-WHEELS.

The Schedule referred to in these Letters Patent and making part of the same.

TO ALL WHOM IT MAY CONCERN:

Be it known that I, JOHN RADDIN, of Lynn, in the county of Essex, and State of Massachusetts, have invented an Improvement in Wheels for Railway and other Carriages; and I do hereby declare that the following, taken in connection with the drawings which accompany and form part of this specification, is a description of my invention sufficient to enable those skilled in the art to practise it.

This invention relates to such a construction of car and carriage-wheels, with reference to introducing between the outer surface of the hub and the tread of the wheel a cushion of rubber, so interposed as to receive any pressure exerted between the hub and tread, and so enclosed as not to fill the space in which it is located, thus allowing the rubber to change its form, and thus utilize its elastic properties in lessening shocks and jars upon the wheel. My invention consists in a wheel having a metal hub and a metal web, or a metal ring, in which the inner ends of the spokes terminate, when said parts are one or both provided with suitable flanges to enclose space between said parts, and when in said space there is located or combined with said parts a stout ring or cushion of rubber which does not fill said space, but has room for such change of form as will allow the cushion to act by virtue of its elasticity to permit relative movements between the hub and tread, and to restore said parts to their normal position on removal of the stress therefrom.

The drawing represents at A and B a side view and a cross-section of a car-wheel, embodying this invention.

$a$ denotes the hub, $b$ the web, $c$ the tread or periphery. The hub is made separate from the web $b$, and has upon its opposite ends flanges $d$, one of which is cast or formed integral with the hub, while the other is fixed upon the opposite end of the hub, as seen in the sectional view of the drawing, these flanges extending over the opposite sides of the wheel adjacent to the hub, as seen in the drawing. The central hole in the web $b$, through which the hub extends, is of greater diameter than the hub, or that part of the hub in line therewith, and between the hub and the web, and enclosed between the flanges $d$, an elastic ring, $e$, is placed, this ring surrounding the hub, and being compressed by any radial movement of the hub towards the tread, forming an elastic cushion for the hub, and the weight of the car or carriage supported thereby. The opposite flanges $d$ are connected by a series of screw-bolts and nuts, $f$, passing through the web and flanges, and, where they extend through the web of the wheel, holes are made for them of such greater diameter as to permit relative radial movement between the hub and web. In a carriage or wooden-spoked wheel, the movable flange may be screwed to the hub, bolts also being used if requisite. Packing, $g$, may be placed between the flanges and the web, as seen at B. In the drawing it will be seen that the space enclosed between the outer part of the hub $a$, the web $b$, and the flanges $d$ $d$, for reception of the rubber ring $e$, is rectangular in cross-section, or substantially square, while the cross-section of the rubber ring is that of an inscribed circle. In carriage or wooden-spoke wheels, the spokes will be entered into a metal ring at their inner ends, this ring being supported between flanges and against the elastic cushion, the same as the web $b$ is shown as supported in the drawing.

By means of wheels having this construction, it will be obvious that carriages, and particularly railway carriages, may be relieved from the sharp concussive jolts consequent upon a solid or unyielding connection between the hubs and treads of the wheels.

I claim arranging the elastic rubber ring or cushion so as to operate within a space, as described, formed between the hub and the web, or its equivalent, and side flanges of a wheel.

In testimony whereof I have hereunto set my signature this fourteenth day of February, A. D. 1867.

JOHN RADDIN.

Witnesses:
J. B. CROSBY,
FRANCIS GOULD.